(12) United States Patent
Endo

(10) Patent No.: US 7,599,082 B2
(45) Date of Patent: Oct. 6, 2009

(54) IMAGE REPRODUCING DEVICE, IMAGE HOLDING DEVICE, AND IMAGE REPRODUCING SYSTEM

(75) Inventor: Masakatsu Endo, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 622 days.

(21) Appl. No.: 10/506,198

(22) PCT Filed: Jul. 25, 2003

(86) PCT No.: PCT/JP03/09470

§ 371 (c)(1),
(2), (4) Date: Sep. 1, 2004

(87) PCT Pub. No.: WO2004/014074

PCT Pub. Date: Feb. 12, 2004

(65) Prior Publication Data

US 2006/0023237 A1     Feb. 2, 2006

(30) Foreign Application Priority Data

Aug. 1, 2002   (JP) .............................. 2002-224632

(51) Int. Cl.
*G06F 15/00* (2006.01)
*G06F 3/12* (2006.01)
*G06K 1/00* (2006.01)

(52) U.S. Cl. .................. 358/1.15; 358/1.13

(58) Field of Classification Search .................. 358/1.1, 358/1.15, 1.16, 1.14, 1.13; 348/207.2
See application file for complete search history.

(56) References Cited

U.S. PATENT DOCUMENTS

| | | | |
|---|---|---|---|
| 6,101,422 A * | 8/2000 | Furlong ........................ 700/96 |
| 6,115,137 A * | 9/2000 | Ozawa et al. ................. 358/1.6 |
| 6,226,011 B1 * | 5/2001 | Sakuyama et al. .......... 345/600 |
| 6,438,635 B1 | 8/2002 | Date et al. |
| 6,948,792 B2 | 9/2005 | Narusawa et al. |
| 2002/0051136 A1 | 5/2002 | Kawamura et al. |
| 2002/0093682 A1 | 7/2002 | Nakajima |
| 2003/0231341 A1 * | 12/2003 | Aichi et al. ................. 358/1.15 |

FOREIGN PATENT DOCUMENTS

| EP | 0 860 980 A2 | 8/1998 |
|---|---|---|
| EP | 0 920 184 A2 | 6/1999 |
| EP | 1 045 571 A2 | 10/2000 |

(Continued)

OTHER PUBLICATIONS

D. Wright, M. Grant, P. Zehler, J. Fujisawa, "XHTML-Print" World Wide Web Consortium, No. 0.95, Jan. 1, 2002, XP002383794.

*Primary Examiner*—Douglas Q Tran
(74) *Attorney, Agent, or Firm*—Sughrue Mion, PLLC

(57) ABSTRACT

Each of setting items in print setting when image data held in a digital camera is printed by a printer is provided with an option of "Depend on printer setting". When print setting data received by the printer contains a setting item of "Depend on printer setting", concerning this setting item, the printer prints the image data based on the designation set in and registered with this printer at this point in time. Consequently, it is possible to increase user-friendliness regarding print setting at the time of printing of the image data in the digital camera, and increase the efficiency of product design work of digital camera manufacturers.

26 Claims, 5 Drawing Sheets

FOREIGN PATENT DOCUMENTS

| | | |
|---|---|---|
| EP | 1 158 766 A1 | 11/2001 |
| EP | 1 370 060 A1 | 12/2003 |
| JP | 9-139876 A | 5/1997 |
| JP | 10-191246 A | 7/1998 |
| JP | 11-55605 A | 2/1999 |
| JP | 11-88672 A | 3/1999 |
| JP | 2000-118086 A | 4/2000 |
| JP | 2000-137806 A | 5/2000 |
| JP | 2001-147481 A | 5/2001 |
| JP | 2001-186297 A | 7/2001 |
| JP | 2001-333363 A | 11/2001 |
| JP | 2002-156711 A | 5/2002 |
| WO | WO 02/65765 A1 | 8/2002 |

\* cited by examiner

| | | |
|---|---|---|
| T10 | VENDOR ID | EPSON(0001h) |
| T11 | NUMBER OF COPIES TO BE PRINTED | 10 |
| T12 | PAPER TYPE | DEPEND ON PRINTER SETTING(0000h) |
| T13 | PAPER SIZE | DEPEND ON PRINTER SETTING(0000h) |
| T14 | LAYOUT | DEPEND ON PRINTER SETTING(0000h) |
| T15 | DATE PRINT | DEPEND ON PRINTER SETTING(0000h) |
| T16 | PRINT QUALITY | DEPEND ON PRINTER SETTING(0000h) |
| T17 | AUTOMATIC CORRECTION | DEPEND ON PRINTER SETTING(0000h) |

FIG. 5

| | | |
|---|---|---|
| T12 | PAPER TYPE | 0000h:DEPEND ON PRINTER SETTING<br>0001h:PLAIN PAPER<br>0002h:CALENDERED PAPER |
| T13 | PAPER SIZE | 0000h:DEPEND ON PRINTER SETTING<br>0001h:POSTCARD<br>0002h:100mm × 150mm<br>0003h:A6<br>0004h:A4<br>0005h:ROLL PAPER |
| T14 | LAYOUT | 0000h:DEPEND ON PRINTER SETTING<br>0001h:1-SCREEN PRINT (BORDERED)<br>0002h:1-SCREEN PRINT (BORDERLESS) |
| T15 | DATE PRINT | 0000h:DEPEND ON PRINTER SETTING<br>0001h:DO NOT PRINT DATE<br>0002h:PRINT DATE OVER IMAGE |
| T16 | PRINT QUALITY | 0000h:DEPEND ON PRINTER SETTING<br>0001h:HIGHEST PICTURE QUALITY<br>0002h:HIGH PICTURE QUALITY<br>0003h:HIGH-SPEED PRINTING |
| T17 | AUTOMATIC CORRECTION | 0000h:DEPEND ON PRINTER SETTING<br>0001h:NO CORRECTION<br>0002h:AUTOMATIC CORRECTION |

FIG. 6

IMAGE REPRODUCING DEVICE, IMAGE HOLDING DEVICE, AND IMAGE REPRODUCING SYSTEM

TECHNICAL FIELD

The present invention relates to an image reproducing device, an image holding device, and an image reproducing system, and particularly relates to an image reproducing device, an image holding device, and an image reproducing system capable of reproducing image data transmitted from the image holding device to the image reproducing device based on reproduction setting in the image reproducing device.

BACKGROUND ART

The digital camera is a device which is connected to a printer for printing. Namely, it is possible to directly connect the digital camera to the printer by a USB (Universal Serial Bus) communication interface cable or the like and print an image taken by the digital camera with the printer. In this case, not only image data but also print setting when printing based on the image data is performed is transmitted from the digital camera to the printer.

However, there are many models of printers to which the digital camera is connected, and setting items in print setting and the kinds and number of options thereof differ depending on printer models. Therefore, in order that print setting can be performed on the digital camera side, various setting screens need to be provided according to respective printer models and hence the development operation thereof becomes a large burden to digital camera manufacturers.

Moreover, the printer is provided with a control panel or the like in its printer main body, and print setting for a print operation to be executed hereafter can be performed by a user's operation of the control panel or the like. Hence, also on the part of the user, the case is assumed where the user wants to perform print setting on the side of the printer in which the user is used to operating and where the user does not want to perform print setting on the side of the digital camera in which the user is not used to operating. In such a case, if only image data to be printed is acquired from the digital camera and printing is performed in accordance with print setting set on the printer side, user-friendliness increases.

The aforementioned problem is not limited to between the digital camera and the printer. As examples of an image holding device, a computer which holds image data on a hard disk and the like are given in addition to the digital camera, and as examples of an image reproducing device, a projector which projects an image based on the image data and the like are given in addition to the printer. In such an image reproducing system, it is desired to improve the user-friendliness of reproduction setting when the image data is reproduced.

SUMMARY OF THE INVENTION

Hence, the present invention is made in view of the aforementioned problem, and an object of the present invention is to reduce the burden of development imposed on manufactures of image holding devices such as a digital camera and improve user-friendliness by making it possible to reproduce an image data transmitted from the image holding device to an image reproducing device based on reproduction setting of the image reproducing device.

In order to accomplish the aforementioned and other objects, according to one aspect of the present invention, an image reproducing device, comprises:

an image data receiver which receives image data;

a reproduction setting data receiver which receives reproduction setting data in which setting when the image data is reproduced is designated;

a judgment section which judges whether the reproduction setting data is dependent setting which designates reproduction based on reproducing device setting set in the image reproducing device or independent setting which designates reproduction based on individual setting designated in the reproduction setting data; and a reproduction executor which reproduces the image data based on the reproducing device setting set in the image reproducing device when the judgment section judges that the reproduction setting data is the dependent setting and reproduces the image data based on the individual setting designated in the reproduction setting data when the judgment section judges that the reproduction setting data is the independent setting.

According to another aspect of the present invention, an image holding device, comprises:

an image data holder which holds image data;

an image data transmitter which transmits the image data held in the image data holder to an image reproducing device; and a reproduction setting data transmitter which transmits, to the image reproducing device, reproduction setting data containing setting when the image data is reproduced, the reproduction setting data containing dependent setting which designates reproduction of the image data based on reproducing device setting set in the image reproducing device or independent setting which designates reproduction of the image data based on individual setting designated in the reproduction setting data.

According to another aspect of the present invention, a control method of an image reproducing device, comprises the steps of:

receiving image data;

receiving reproduction setting data in which setting when the image data is reproduced is designated;

judging whether the reproduction setting data is dependent setting which designates reproduction based on reproducing device setting set in the image reproducing device or independent setting which designates reproduction based on individual setting designated in the reproduction setting data;

reproducing the image data based on the reproducing device setting set in the image reproducing device when it is judged that the reproduction setting data is the dependent setting; and reproducing the image data based on the individual setting designated in the reproduction setting data when it is judged that the reproduction setting data is the independent setting.

According to another aspect of the present invention, a control method of an image holding device, comprises the steps of:

holding image data in an image data holder;

transmitting the image data held in the image data holder to an image reproducing device; and transmitting, to the image reproducing device, reproduction setting data containing setting when the image data is reproduced, the reproduction setting data containing dependent setting which designates reproduction of the image data based on reproducing device setting set in the image reproducing device or independent setting which designates reproduction of the image data based on individual setting designated in the reproduction setting data.

According to another aspect of the present invention, a program causes an image reproducing device to execute procedure comprising the steps of:

receiving image data;

receiving reproduction setting data in which setting when the image data is reproduced is designated;

judging whether the reproduction setting data is dependent setting which designates reproduction based on reproducing device setting set in the image reproducing device or independent setting which designates reproduction based on individual setting designated in the reproduction setting data;

reproducing the image data based on the reproducing device setting set in the image reproducing device when it is judged that the reproduction setting data is the dependent setting; and reproducing the image data based on the individual setting designated in the reproduction setting data when it is judged that the reproduction setting data is the independent setting.

According to another aspect of the present invention, a program causes an image holding device to execute procedure comprising the steps of:

holding image data in an image data holder;

transmitting the image data held in the image data holder to an image reproducing device; and transmitting, to the image reproducing device, reproduction setting data containing setting when the image data is reproduced, the reproduction setting data containing dependent setting which designates reproduction of the image data based on reproducing device setting set in the image reproducing device or independent setting which designates reproduction of the image data based on individual setting designated in the reproduction setting data.

According to another aspect of the present invention, a program is recorded in a record medium, and the program causes an image reproducing device to execute procedure comprising the steps of:

receiving image data;

receiving reproduction setting data in which setting when the image data is reproduced is designated;

judging whether the reproduction setting data is dependent setting which designates reproduction based on reproducing device setting set in the image reproducing device or independent setting which designates reproduction based on individual setting designated in the reproduction setting data;

reproducing the image data based on the reproducing device setting set in the image reproducing device when it is judged that the reproduction setting data is the dependent setting; and reproducing the image data based on the individual setting designated in the reproduction setting data when it is judged that the reproduction setting data is the independent setting.

According to another aspect of the present invention, a program is recorded in a record medium, and the program causes an image holding device to execute procedure comprising the steps of:

holding image data in an image data holder;

transmitting the image data held in the image data holder to an image reproducing device; and transmitting, to the image reproducing device, reproduction setting data containing setting when the image data is reproduced, the reproduction setting data containing dependent setting which designates reproduction of the image data based on reproducing device setting set in the image reproducing device or independent setting which designates reproduction of the image data based on individual setting designated in the reproduction setting data.

According to another aspect of the present invention, an image reproducing system includes an image holding device and an image reproducing device connected to the image holding device, wherein the image holding device comprises:

an image data holder which holds image data;

an image data transmitter which transmits the image data held in the image data holder to the image reproducing device; and a reproduction setting data transmitter which transmits, to the image reproducing device, reproduction setting data containing setting when the image data is reproduced, the reproduction setting data containing dependent setting which designates reproduction of the image data based on reproducing device setting set in the image reproducing device or independent setting which designates reproduction of the image data based on individual setting designated in the reproduction setting data, and the image reproducing device comprises:

an image data receiver which receives the image data;

a reproduction setting data receiver which receives the reproduction setting data;

a judgment section which judges whether the reproduction setting data is the dependent setting or the independent setting; and a reproduction executor which reproduces the image data based on the reproducing device setting set in the image reproducing device when the judgment section judges that the reproduction setting data is the dependent setting and which reproduces the image data based on the individual setting designated in the reproduction setting data when the judgment section judges that the reproduction setting data is the independent setting.

According to another aspect of the present invention, an image holding device, comprises:

an image data holder which holds image data;

an image data transmitter which transmits the image data held in the image data holder to an image reproducing device; and a reproduction setting data transmitter which transmits, to the image reproducing device, reproduction setting data containing dependent setting which designates reproduction of the image data based on reproducing device setting set in the image reproducing device.

BRIEF DESCRIPTION OF THE DRAWINGS

FIG. 5 is a diagram explaining an example of the configuration of print setting data stored in a memory of the digital camera according to this embodiment;

FIG. 6 is a diagram explaining a list of setting items each including an option of "Depend on printer setting" out of setting items of the print setting data and options thereof;

PREFERRED EMBODIMENT

An embodiment of the present invention is designed in such a manner that an option of "Depend on printer setting" is provided as an option of print setting for the paper type, paper size, and so on, and when such an option is selected as print setting, at the time of printing, a printer executes a print operation based on the contents of print setting set on the printer side. Further details will be given below.

Figure 1:
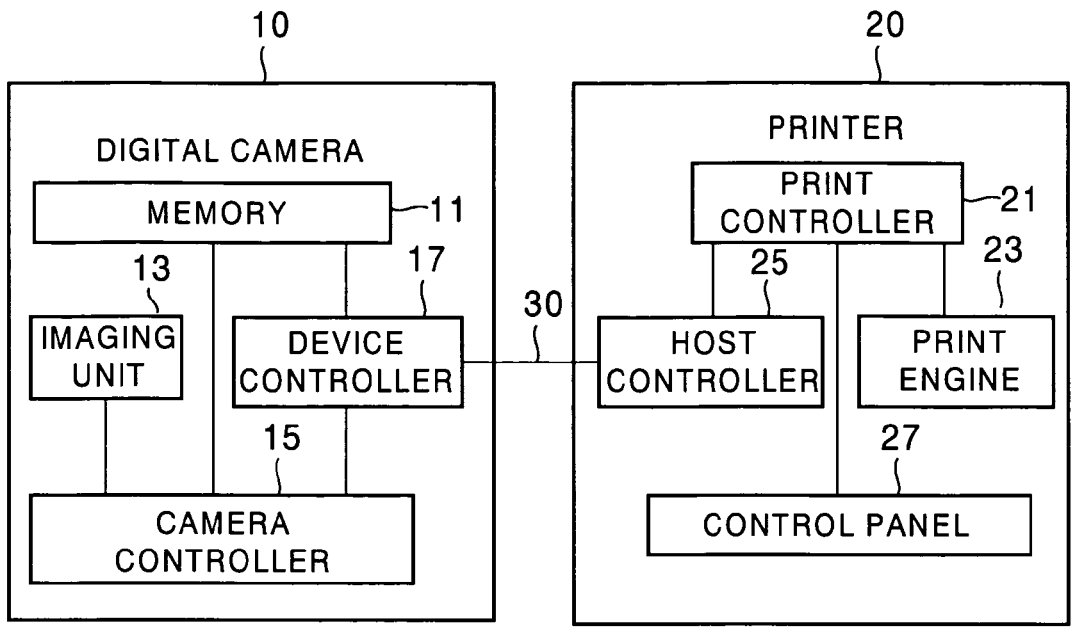
FIG. 1 is a block diagram explaining the configuration of a print system according to an embodiment of the present invention.

FIG. 1 is a block diagram explaining the entire configuration of a print system according to this embodiment. As shown in FIG. 1, the print system according to this embodiment includes a digital camera 10 and a printer 20 connected to the digital camera 10 via a USB communication interface cable 30.

The digital camera 10 includes a memory 11, an imaging unit 13, a camera controller 15, and a device controller 17. Image data taken by the imaging unit 13 is stored in the memory 11. This image data is stored, for example, in the form of a JPEG file or some other general format file. The imaging unit 13 takes a picture and converts it into an electrical signal.

Roughly speaking, the camera controller 15 controls operations of respective portions of the digital camera 10. The device controller 17 controls communication with a USB host such as the printer 20.

To be precise, the camera controller 15 includes various kinds of operation buttons including a shutter button, a liquid crystal display panel, and so on. Based on a shutter button operation, the camera controller 15 drives the imaging unit 13 and allows the imaging unit 13 to take a picture, receives an electrical signal of a taken image from the imaging unit 13, creates a file of image data, and writes the file into the memory 11, or based on a predetermined image reference button operation, reads a desired image from the memory 11 and displays the image on the liquid crystal display panel.

Moreover, the camera controller 15 creates a control command (printer status request) which requests acquisition of a printer status regularly, selects and reads a file of image data to be printed from the memory 11 based on a user's image selection button operation, generates print setting data indicating the contents of print setting (for example, the number of copies to be printed, paper type, paper size, layout, date print, print quality, automatic correction, and the like) based on a user's print setting button operation, creates a control command (print request) which requests print execution based on a user's print request button operation following the image selection button operation, or creates a control command (print stop request) which requests a print stop based on a user's print stop button operation.

The device controller 17 has a function of communicating with the USB host while meeting the USB standard as a USB storage class device. Hence, the USB host can search various directories in the memory 11 and freely access a desired data file.

Further, although details will be given later, the device controller 17 according to this embodiment can transmit the aforementioned control commands such as the printer status request, print request, and print stop request created by the camera controller 15 to the printer 20 in virtually the same manner that the digital camera 10 voluntarily transmits the control commands.

Meanwhile, the printer 20 includes a print controller 21, a print engine 23, a host controller 25, and a control panel 27. Roughly speaking, the print controller 21 performs the transmission of the printer status, reading of the image file to be printed from the memory 11, rendering of a print image, and other various controls in response to the printer status request, print request, print stop request, and so on transmitted from the digital camera 10. The host controller 25 has a function of communicating with the USB device as the USB host. The print engine 23 executes a print operation under the control of the print controller 21.

To be precise, the print controller 21 includes a function of receiving general-purpose compression format image data such as a JPEG file or some other general format file, expanding the image data, and converting it into bitmap image data, a color conversion function of converting an RGB pixel value of the bitmap image data into a CMYK pixel value, and a halftoning function of converting the multiple-tone pixel value of the color-converted bitmap image data into an area coverage modulation pixel value in which dots and blanks are represented.

Therefore, the digital camera 10 need not necessarily include a function of expanding, color-converting, and halftoning the image data file to be printed such as a JPEG file stored in the memory 11, and it is only required to include a function of transmitting the image data file as it is to the printer 20. Consequently, the advantage that the configuration of the digital camera 10 need not be customized to each model of the printer 20 and may be for general purpose use can be obtained.

The host controller 25 has a function of reading and writing a desired data file in a desired directory by accessing the memory 11 of the digital camera 10, which functions as a storage class USB device, in accordance with the USB standard. Although details will be described later, the host controller 25 can receive the aforementioned control commands such as the printer status request, print request, and print stop request created by the camera controller 15 from the digital camera 10 in virtually the same manner that the control commands are transmitted voluntarily from the digital camera 10.

The control panel 27 is a panel operated when the user performs print setting and registers it with the printer 20. Namely, when the user performs print setting composed of setting items such as the number of copies to be printed, paper type, paper size, layout, date print, print quality, automatic correction, and so on and registers the print setting with the printer 20, the user performs necessary setting and registration by operating the control panel 27.

Figure 2:
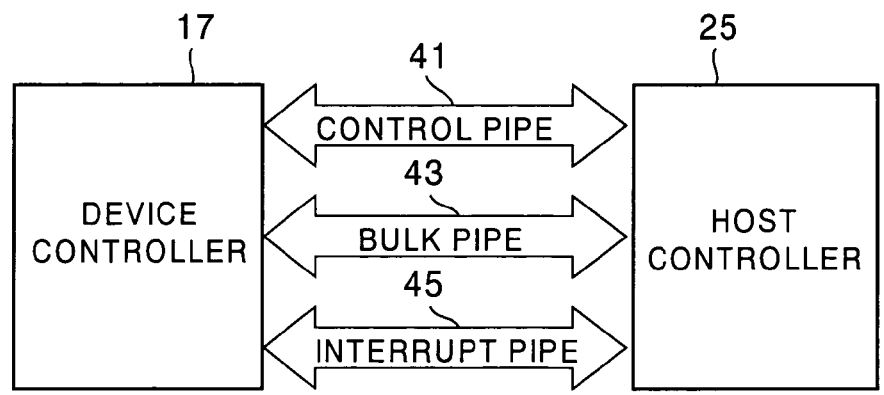
FIG. 2 is a diagram explaining the configuration of logical pipes formed between a digital camera and a printer in this embodiment.

FIG. 2 is a diagram showing logical pipes (logical communication channels) used when the device controller 17 of the digital camera 10 and the host controller 25 of the printer 20 communicate with each other.

As shown in FIG. 2, three kinds of communication pipes of a control pipe 41, a bulk pipe 43, and an interrupt pipe 45 are used between the device controller 17 and the host controller 25. The control pipe 41 is used for the transmission of various kinds of control commands from the digital camera 10 to the printer 20 and from the printer 20 to the digital camera 10. The bulk pipe 43 is used for data transmission including the transmission of the image data file from the digital camera 10 to the printer 20 and the transmission of the printer status data from the printer 20 to the digital camera 10. The interrupt pipe 45 is used for the transmission of a request inquiry command of "Interrupt In" from the printer 20 to the digital camera 10.

All of these three kinds of pipes are defined by the USB standard. However, the USB standard prescribes nothing about the use of the interrupt pipe 45 in regard to communication by the storage device. Hence, in this embodiment, by effectively using the interrupt pipe 45, various kinds of control commands can be transmitted practically voluntarily from the USB storage type digital camera 10 to the USB host printer 20.

Namely, when the printer 20 is connected with the digital camera 10 via the USB communication interface cable 30, the printer 20 transmits the "Interrupt In" command to the digital camera 10 through the interrupt pipe 45 at very short intervals from the user's standpoint, for example, at least once per millisecond. Each time the digital camera 10 receives the "Interrupt In" command, the digital camera 10 transmits a reply thereto to the printer 20 through the control pipe 41.

When some kind of control command such as the aforementioned printer status request, print request, or print stop request was created in the digital camera 10 at a point in time when the digital camera 10 has received the "Interrupt In" command, the digital camera 10 transmits the control command as a reply to the "Interrupt In" command to the printer 20.

The printer 20 interprets the transmitted control command and executes the operation (for example, the transmission of the printer status, execution of a print operation, or stop of the print operation) requested by the digital camera 10. As a result, it becomes possible to operate the printer 20 seemingly under the practically voluntary control of the digital camera 10.

Incidentally, when executing a print operation in response to the print request, the printer 20 reads various data resources (for example, the image data file to be printed, the print setting data file, and so on) necessary for the print operation from the digital camera 10 at its own discretion by using the fact that the digital camera 10 is a storage class. Therefore, the digital camera 10 has only to perform the operation as the storage class of storing the data resources necessary for the print operation in the memory 11 and reading the data resource in response to a read request from the printer 20.

Figure 3:
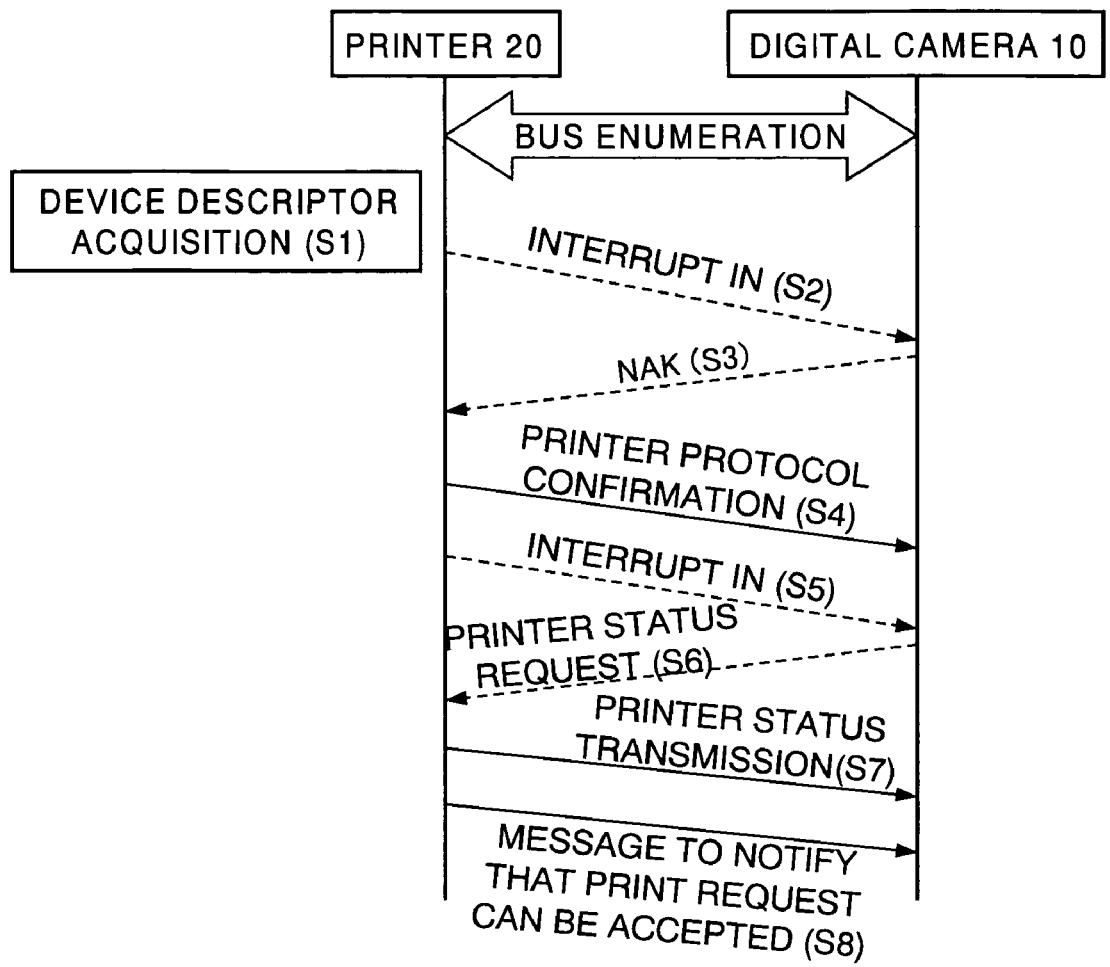
FIG. 3 is a sequence diagram showing an example of an initial communication procedure immediately after communication has been established between the digital camera and the printer according to this embodiment.

Next, the flow of initial communication performed at the early stages after a communication connection by USB has been established between the printer 20 and the digital camera 10 will be explained based on FIG. 3. As shown in FIG. 3, when the printer 20 and the digital camera 10 are connected by the USB communication interface cable 30 while both of them are already powered on, or when the printer 20 and the digital camera 10 are powered on while both of them are already connected by the USB communication interface cable 30, a USB communication connection is established between the printer 20 and the digital camera 10.

When the USB communication connection has been established, the host controller 25 of the printer 20 acquires from the device controller 17 of the digital camera 10 a "device descriptor" in which the configuration thereof as the USB device is described (step S1). The device descriptor from the digital camera 10 contains an "interface descriptor" in which it is described that the digital camera 10 is a storage class device. The interface descriptor contains a "string descriptor" in which plural end points of the USB used by the digital camera 10 (end points where packets are transmitted or received by using any of three kinds of pipes 41, 43, and 45 shown in FIG. 2) are enumerated.

Specifically, in this string descriptor, in addition to end points which are to be possessed by a storage device defined by the USB standard (for example, a "Bulk Out" end point and a "Bulk In" end point), an "Interrupt In" end point which is an additional end point in this embodiment is described. Accordingly, the host controller 25 of the printer 20 confirms from the interface descriptor and the strings descriptor thereof that the digital camera 10 is a storage class device and a device which uses the "Interrupt In" command (command to inquire about a request on the USB device side).

The printer 20 which has acquired the device descriptor of the digital camera 10 transmits a "print protocol confirmation command" to the digital camera 10 through the control pipe 41 within a predetermined short time (for example, within one second) from this point in time (step S4). Thereby, the printer 20 notifies the digital camera 10 of the type of a used communication protocol (namely, the type which uses the "Interrupt In" command), the protocol version, and the like.

Aside from the above, after the communication connection has been established, the printer 20 transmits the "Interrupt In" command to the digital camera 10 through the interrupt pipe 45 periodically, for example, once per millisecond (step S2, Step S5, and so on). Each time the digital camera 10 receives the "Interrupt In" command, the digital camera 10 determines whether some control command is generated within the digital camera 10 at that point in time. If no control command is generated, the digital camera 10 transmits a "Nak message", which means no request, to the printer 20 through the control pipe 41 (step S3 and so on). On the other hand, when some control command is generated within the digital camera 10 at a point in time when the "Interrupt In" command has been received, the digital camera 10 transmits this control command to the printer 20 through the control pipe 41 (step S6 and so on).

As described above, such a control command is the printer status request, the print request, the print stop request, or the like. For example, in step S6 in FIG. 3, the printer status request is transmitted to the printer 20 as a reply to the "Interrupt In" command in step S5. The printer 20 which has received the printer status request checks up on the latest printer status and writes data indicating the printer status into a predetermined directory in the memory 11 of the digital camera 10 through the bulk pipe 43 (step S7). Thereby, the digital camera 10 acquires the latest printer status. Hence, for example, this printer status can be displayed on the liquid crystal display panel or the like of the digital camera 10.

Also, when the printer 20 is brought into a state capable of accepting the print request after the communication connection has been established, at the first reception of the printer status request in the state (step S6), the printer 20 not only transmits the printer status data to the digital camera 10 (step S7) but also transmits a message to notify that the print request can be accepted to the digital camera 10 through the control pipe 41 (step S8).

Incidentally, the timing in which the printer status request is generated in the digital camera 10 can be changed depending on the design of the digital camera 10, and the timing can be set at regular intervals, for example, at five-second intervals or at one-second intervals, for example, during the period from the transmission of the print request to the printer 20 till printing is completed, or during the period from the transmission of the print stop request to the printer 20 till printing is stopped.

Figure 4:
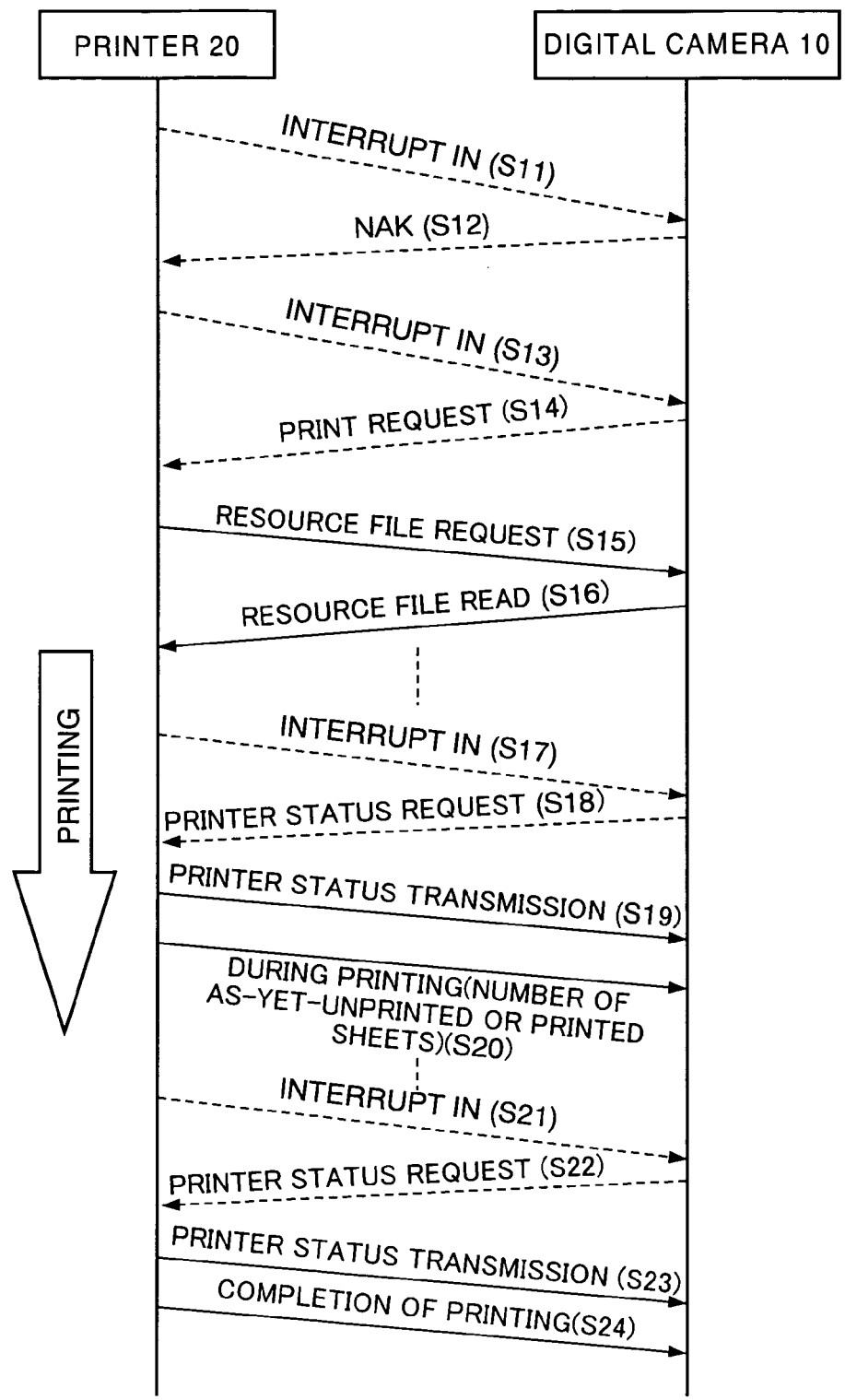
FIG. 4 is a sequence diagram showing an example of a communication procedure when a print request is transmitted from the digital camera to the printer between the digital camera and the printer according to this embodiment.

FIG. 4 shows an example of a communication procedure when the print request is transmitted from the digital camera 10 to the printer 20 and the printer 20 executes a print operation. As shown in FIG. 4, the printer 20 transmits the "Interrupt In" command to the digital camera 10 at predetermined time intervals (step S11, step S13, step S17, step S21, and so on). As shown in step S13, when the print request is generated in the digital camera 10 at a point in time when the "Interrupt In" command has been received, the digital camera 10 transmits the print request as a reply to the "Interrupt In" command to the printer 20 through the control pipe 41 (step S14).

The printer 20 which has received this print request transmits a command (resource file request command) to read resource files necessary for printing requested by the print request from the memory 11 of the digital camera 10 to the digital camera 10 (step S15). In response to this command, the printer 20 reads the necessary resource files from the memory 11 of the digital camera 10 through the intermediation of the device controller 17 of the digital camera 10 (step S16), and executes a print operation based on the resource files.

Here, the resource files necessary for printing includes the image data file to be printed (its path name and file name are described in the print request), the print setting file of the print setting data in which setting is described in various setting items on printing (its path name and file name are described in the print request), and so on. The printer 20 reads these resource files from the memory 11 of the digital camera 10 at its own discretion and performs conversion processes such as expansion, color conversion, and halftoning, and hence the digital camera 10 need not perform any complicated process in particular.

Incidentally, in this embodiment, it is explained that these image data file and print setting data file are stored in the memory 11 of the digital camera 10 and read from the memory 11 by the printer 20, and also in this case, the image data file and the print setting data file are transmitted from the digital camera 10 through the USB connection interface cable 30 and received by the printer 20. Hence, in a broad sense, it can be said that these image data file and print setting data file are transmitted from the digital camera 10 to the printer 20.

Also during printing, the printer 20 transmits the "Interrupt In" command to the digital camera 10 at the predetermined time intervals (step S17 and so on). The digital camera 10 which has received the "Interrupt In" command after transmitting the print request (after step S14) transmits a printer status request to the printer 20 (step S18 and so on). The printer 20 which has received this printer status request during printing not only transmits the printer status to the digital camera 10 (step S19) but also checks up on the latest print state (for example, the number of as-yet-unprinted sheets or the number of printed sheets) and transmits a message that the printer is printing, containing data on the latest print state (step S20).

Also after the completion of printing, the printer 20 transmits the "Interrupt In" command to the digital camera 10 at the predetermined time intervals (step S21). When the printer 20 has received the printer status request from the digital camera 10 after the completion of printing (step S22), the printer 20 not only transmits the printer status (step S23) but also transmits a message that printing has been completed to the digital camera 10 through the control pipe 41 (step S24). The digital camera 10 which has received the message that the printing has been completed controls the operation of the digital camera 10 itself so that a new print request can be issued.

Next, the file structure and setting items of the print setting data stored in the memory 11 of the digital camera 10 according to this embodiment will be explained based on FIG. 5 and FIG. 6. FIG. 5 is a diagram showing an example of the structure of a print setting data file PSET stored in the memory 11 of the digital camera 10, and FIG. 6 is a diagram showing a list of options of setting items prescribed in the print setting data file PSET.

As shown in FIG. 5, the print setting data file PSET according to this embodiment includes a vendor ID T10, a number of copies to be printed T11, a paper type T12, a paper size T13, a layout T14, a date print T15, a print quality T16, and an automatic correction T17 as setting items.

In the vendor ID T10, information to specify the vendor of the printer is stored. In the number of copies to be printed T11, information setting the number of copies of the image data to be printed, which is transmitted to the printer 20 together with the print setting data file PSET, (for example, two copies per image) is stored. In the paper type T12, information specifying the type of print paper on which the image data is printed is stored. As shown in FIG. 6, in this embodiment, three options of "Depend on printer setting", "plain paper", and "calendered paper" are provided as options of the paper type T12. When "Depend on printer setting" is stored in the paper type T12, the printer 20 performs conversion processes such as expansion, color conversion, and halftoning on the image data based on the designation of the paper type set at this point in time in the printer 20 instead of the designation thereof from the digital camera 10 and executes a print operation. When "plain paper" or "calendered paper" is stored in the paper type T12 and designated, priority is given to the designation from the digital camera 10.

In the paper size T13, information specifying the size of print paper on which the image file is printed is stored. In this embodiment, six options of "Depend on printer setting", "postcard", "100 mm×150 mm", "A6", "A4", and "roll paper" are provided as options of the paper size T13. When "Depend on printer setting" is stored in the paper size T13, the printer 20 executes a print operation based on the designation of a paper size set at this point in time in the printer 20 instead of the designation thereof from the digital camera 10. Namely, the printer 20 performs conversion processes such as expansion, color conversion, and halftoning on the image data so as to fit the paper size set in the printer and executes the print operation. On the other hand, "postcard", "100 mm×150 mm", "A6", "A4", or "roll paper" is stored in the paper size T13, priority is given to the designation from the digital camera 10. For example, when "postcard" is designated as the paper size T13, the printer 20 performs conversion processes such as expansion, color conversion, and halftoning on the image data so as to fit the postcard size and executes a print operation.

In the layout T14, information specifying a layout when the image data file is printed. In this embodiment, three options of "Depend on printer setting", "1-screen print (bordered)", and "1-screen print (borderless)" are provided as options of the layout T14. When "Depend on printer setting" is stored in the layout T14, the printer 20 executes a print operation based on the designation of a layout set at this point in time in the printer 20 instead of the designation thereof from the digital camera 10. Namely, the printer 20 performs conversion processes such as expansion, color conversion, and halftoning on the image data so as to fit the layout set in the printer and executes the print operation. "1-screen print (bordered)" is stored in the layout T14, based on this designation, the printer 20 performs conversion processes such as expansion, color conversion, and halftoning on the image data in the layout in which one image is printed on one piece of print paper and so as to fit the bordered layout, and executes a print operation. When "1-screen print (borderless)" is stored in the layout T14, based on this designation, the printer 20 performs conversion processes such as expansion, color conversion, and halftoning on the image data in the layout in which one image is printed on one piece of print paper and so as to fit the borderless layout, and executes a print operation.

In the date print T15, information specifying whether the picture taking date is printed when the image data file is printed is stored. In this embodiment, three options of "Depend on printer setting", "Do not print date", and "Print date over image" are provided as options of the date print T15. When "Depend on printer setting" is stored in the date print T15, the printer 20 executes a print operation based on the designation of the presence/absence of date print which is set at this point in time in the printer 20 instead of the designation thereof from the digital camera 10. Namely, the printer 20 performs conversion processes such as expansion, color conversion, and halftoning on the image data so as to fit the setting of the presence/absence of date print registered with the printer and executes the print operation. When "Do not print date" is stored in the date print T15, based on this designation, the printer 20 performs conversion processes such as expansion, color conversion, and halftoning on the image so as not to print the picture taking date, and executes a print operation. When "Print date over image" is stored in the date print T15, based on this designation, the printer 20 performs conversion processes such as expansion, color conversion, and halftoning on the image data, for example, so as to print the picture taking date in the right corner of the image to be printed over the image, and executes a print operation.

In the print quality T16, information specifying the quality when the image file is printed is stored. In this embodiment, four options of "Depend on printer setting", "highest picture quality", "high picture quality", and "high-speed printing" are provided as options of the print quality T16. When "Depend on printer setting" is stored in the print quality T16, the printer 20 executes a print operation based on a print quality set at this point in time in the printer 20 instead of the designation thereof from the digital camera 10. Namely, the printer 20 performs conversion processes such as expansion, color conversion, and halftoning on the image data so as to fit the print quality set in the printer and executes the print operation. When "highest picture quality", "high picture quality", or "high-speed printing" is stored in the print quality T16, the printer 20 performs conversion processes such as expansion, color conversion, and halftoning on the image data so as to fit the quality based on this designation, and executes a print operation.

In the automatic correction T17, information specifying whether automatic correction is performed when the image file is printed is stored. In this embodiment, three options of "Depend on printer setting", "no correction", and "automatic correction" are stored as options of the automatic correction T17. When "Depend on printer setting" is stored in the automatic correction T17, the printer 20 executes a print operation based on the presence/absence of automatic correction set at this point in time in the printer 20 instead of the designation thereof from the digital camera 10. Namely, the printer 20 performs conversion processes such as expansion, color conversion, and halftoning on the image data so as to fit the setting of the presence/absence of automatic correction registered with the printer and executes the print operation. When "no correction" is stored in the automatic correction T17, the printer 20 performs conversion processes such as expansion, color conversion, and halftoning on the image so as to print the image without automatic correction, and executes a print operation. When "automatic correction" is stored in the automatic correction T17, the printer 20 performs conversion processes such as expansion, color conversion, and halftoning on the image data, for example, so as to adjust the brightness of the image to be printed, and executes a print operation.

As can be seen from the above description, the printer 20 judges whether each setting item of the received print setting data is "dependent setting" which indicates dependence on printer setting or "independent setting" which indicates dependence on setting designated in this print setting data. As concerns setting items being dependent setting, conversion processes such as expansion, color conversion, and halftoning for the image data are performed based on print setting registered with the printer at that point in time, and as concerns setting items being independent setting, conversion processes such as expansion, color conversion, and halftoning for the image data are performed based on setting designated in the print setting data.

Figure 7:
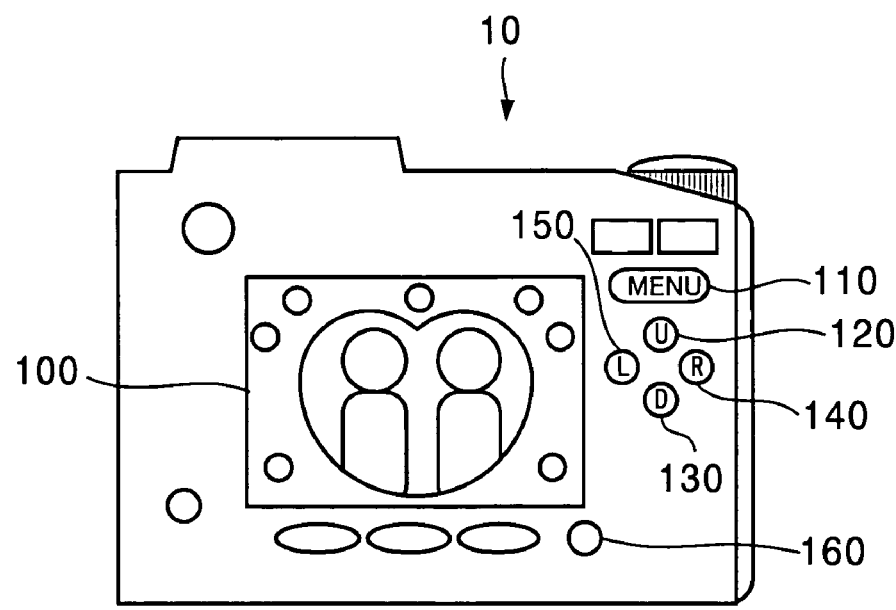
FIG. 7 is a diagram explaining a layout on the operation surface side of the digital camera according to this embodiment.

Next, operations when the user performs print setting by the use of the digital camera 10 will be explained based on FIG. 7 and FIG. 8. FIG. 7 is a diagram showing an example of a layout on the operation surface side of the digital camera 10, and FIG. 8 is a diagram showing an example of a print setting screen W10.

As shown in FIG. 7, the digital camera 10 according to this embodiment is provided with a liquid crystal display panel 100 in its central portion. When the user takes a picture with this digital camera 10, an image to be taken is displayed on the liquid crystal display panel 100.

On the right side of the liquid crystal display panel 100, a menu button 110, an upward button 120, a downward button 130, a rightward button 140, a leftward button 150, and a decision button 160 are arranged. When the user presses the menu button 110 to select a print setting screen, the print setting screen W10 shown in FIG. 8 is displayed on the liquid crystal display panel 100.

Figure 8:
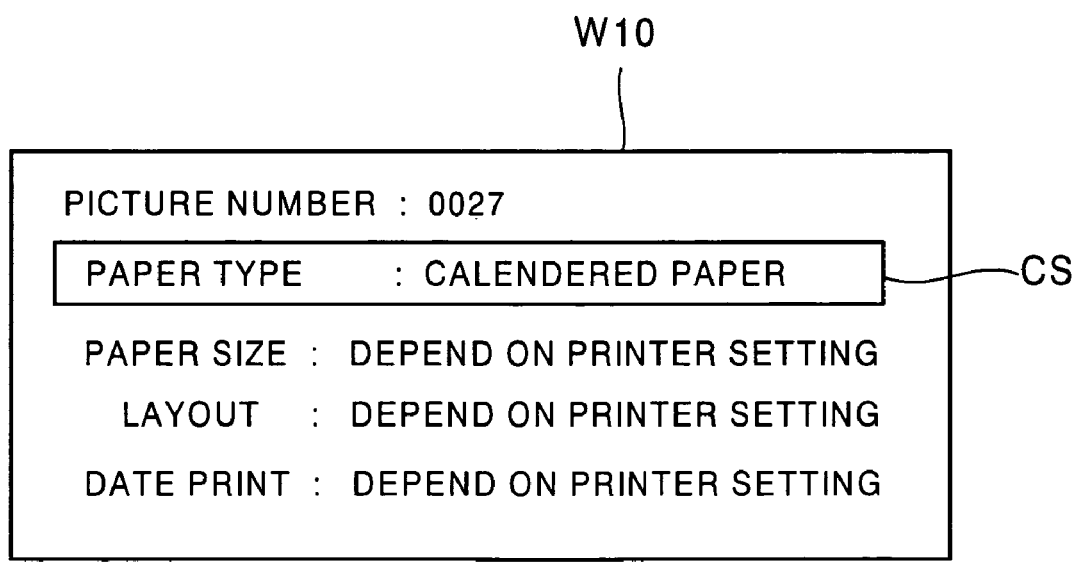
FIG. 8 is a diagram showing an example of a print setting screen displayed on a liquid crystal display panel of the digital camera according to this embodiment.

As shown in FIG. 8, a cursor CS is displayed on the print setting screen W10. This cursor CS moves upward by pressing the upward button 120, and moves downward by pressing the downward button 130. Moreover, by pressing the rightward button 140, options of the setting item at which the cursor CS is located are shifted in a forward direction, and by pressing the leftward button 150, the options are shifted in a backward direction. For example, if the rightward button 140 is pressed while the cursor CS is located in the paper type, "Depend on printer setting", "plain paper", and "calendered paper" are displayed as options in sequence.

If the downward button 130 is pressed while the cursor CS is located at the setting item on the lowest side of the print setting screen W10, the print setting screen W10 scrolls down in sequence, and the next setting items are displayed. Contrary to this, if the upward button 120 is pressed while the cursor CS is located at the setting item on the uppermost side of the print setting screen W10, the print setting screen W10 scrolls up in sequence, and the previous setting items are displayed.

The image to be printed is selected by moving the cursor CS to the position of "picture number" and operating the rightward button 140 and the leftward button 150. Namely, by pressing the rightward button 140, the picture number increases by one, and by pressing the leftward button 150, the picture number decreases by one. The user performs the selection of the picture to be printed and print setting thereof by repeating the above operation.

When all settings are completed, the user presses the decision button 160 shown in FIG. 7. By pressing the decision button 160, one image data file held in the memory 11 is specified, and a print setting data file based on the set contents is formed in the memory 11. Then, the aforementioned print request command (See step S14 in FIG. 4) is transmitted from the digital camera 10 to the printer 20, and a print operation is started. Namely, the image data file and the print setting data file are transmitted to the printer 20, and the print operation is started.

As described above, according to the print system of this embodiment, the option of "Depend on printer setting" is provided in setting items of print setting, so that the user can print the image in the digital camera 10 based on the print setting set by operating the control panel 27 on the printer 20 side. Consequently, user-friendliness increases. For example, if the paper size is set to "postcard" on the printer 20 side, and the paper size T13 is set to "Depend on printer setting" in the digital camera 10, on the printer 20 side, image data can be subjected to expansion, color conversion, and halftoning in the size which fits postcard size printing on the premise that the size of print paper for printing is a postcard size.

Besides, if setting items in print setting are each provided with an option which is entrusted to the designation on the printer 20 side, a manufacturer of the digital camera 10 need not design the print setting screen W10 according to many printer models. Namely, in many cases, options of setting items in print setting differ depending on printer models. Therefore, if necessary setting items in print setting are always designated from the digital camera 10 side, the manufacturer of the digital camera 10 is required to design the print setting screen W10 for each printer model. However, if at least the option of "Depend on printer setting" is provided as in this embodiment, it is not always necessary to design the print setting screen W10 for each printer model.

If further reference is made, the digital camera 10 side is only required to include a function of selecting image data to be printed if all of print setting items depend on printer setting, whereby the design concerning the print setting of the digital camera 10 can be extremely simplified. In this case, the user does not set the setting items of print setting, but the digital camera 10 holds the value of "Depend on printer setting" as a setting value, and transmits this value with image data to the printer 20 regardless of the user's intention.

It should be mentioned that the present invention is not limited to the aforementioned embodiment, and various changes may be made therein. For example, in the aforementioned embodiment, the digital camera 10 and the printer 20 are connected by USB communication, but they may be connected by some other communication standard such as parallel communication.

Moreover, setting items of print setting data are not limited to the setting items in the aforementioned embodiment, and other setting items may be contained or the setting items given as examples in the embodiment may be omitted. Further, the kinds and number of options thereof can be freely designed.

Furthermore, in the aforementioned embodiment, the digital camera 10 is given as an example of an image holding device, and the printer 20 is given as an example of an image reproducing device, but a combination of the image holding device and the image reproducing device is not limited to the above. In this case, setting items contained in reproduction setting may be designed properly according to the kinds of the image holding device and the image reproducing device.

The invention claimed is:

1. An image reproducing device, which is connectable to an image holding device via an interface, wherein the image reproducing device functions as a host device and the image holding device functions as a client device, and the image reproducing device obtains image data of digital image and reproduction setting data from the image holding device, a setting for a reproduction of the image data being designated in the reproduction setting data, the image reproducing device, comprising:
a host controller which controls the image holding device so that the image reproducing device reads the image data and the reproduction setting data from the image holding device when a print request command comprising a request to reproduce the image data based on the reproduction setting data is received from the image holding device via the interface, wherein the host controller periodically transmits a request inquiry command to the image holding device, and the print request command is transmitted from the image holding device to the image reproducing device if the request command has been generated in the image holding device when the image holding device receives the request inquiry command, wherein the image holding device is able to transmit another request command other than the print request command to the image reproducing device if the other request command has been generated in the image holding device when the image holding device receives the request inquiry command and the image holding device transmits a negative message to the image reproducing device if neither the print request command nor the other request command has been generated in the image holding device when the image holding device receives the request inquiry command;
a judgment section which judges whether the reproduction setting data is a dependent setting which designates reproduction based on a reproducing device setting set in the image reproducing device or an independent setting which designates reproduction based on an individual setting designated in the reproduction setting data; and
a reproduction executor which reproduces the image data based on the reproducing device setting set in the image reproducing device when the judgment section judges that the reproduction setting data is the dependent setting and reproduces the image data based on the individual setting designated in the reproduction setting data when the judgment section judges that the reproduction setting data is the independent setting.

2. The image reproducing device according to claim 1, wherein
the reproduction setting data contains plural setting items,
the judgment section judges whether each setting item contained in the reproduction setting data is the dependent setting or the independent setting, and
the reproduction executor performs setting based on the judgment with respect to each setting item in the judgment section to reproduce the image data.

3. The image reproducing device according to claim 2, wherein the reproduction executor performs, to the image data, a conversion process necessary for the reproduction based on the setting.

4. The image reproducing device according to any one of claims 1 to 3, further comprising a user setting section which causes a user to set the reproducing device setting in the image reproducing device.

5. The image reproducing device according to claim 1, wherein the reproduction setting data contains plural setting items and wherein the judgment section judges a setting item, in which a predetermined number of zero digits are included, to be the dependent setting.

6. An image holding device, which is connectable to an image reproducing device via an interface, wherein the image reproducing device includes a host controller, the image holding device comprising:
an image data holder which holds image data of a digital image;

an operation unit that sets a reproduction setting data in which a setting for a reproduction of the image data is designated and which instructs the image reproducing device to reproduce the image data;

a request command generator which generates a print request command in response to the operation unit and another request command, wherein the print request command is a command which requests the image reproducing device to reproduce the image data and the other request command is a request command other than the print request command; and a device controller which allows the image reproducing device to access the image data in the image data holder under a control of the image reproducing device, wherein the device controller periodically receives a request inquiry command from the image reproducing device, and the print request command is transmitted to the image reproducing device if the print request command has been generated in the image holding device when the request inquiry command is received, and the image holding device is able to transmit the other request command to the image reproducing device if the other request command has been generated in the image holding device when the device controller receives the request inquiry command, and the image holding device transmits a negative message to the image reproducing device if neither the print request command nor the other request command has been generated in the image holding device when the device controller receives the request inquiry comment, and the reproduction setting data containing a dependent setting or an independent setting is transmitted from the image holding device to the image reproducing device, the dependent setting designates reproduction of the image data based on a reproducing device setting set in the image reproducing device, and the independent setting designates reproduction of the image data based on an individual setting designated in the reproduction setting data.

7. The image holding device according to claim 6, wherein the reproduction setting data contains plural setting items, and whether the dependent setting or the independent setting is designated in each setting item.

8. The image holding device according to claim 7, wherein when the setting item is the independent setting, information specifying setting based on which the image data is reproduced is designated.

9. The image holding device according to claim 8, further comprising a reproduction setting designator which causes a user to designate the dependent setting or the independent setting with respect to each setting item.

10. The image holding device according to claim 6, wherein the reproduction setting data contains plural setting items and wherein the image reproducing device judges a setting item in which a predetermined number of zero digits are included, to be the dependent setting.

11. A control method of an image reproducing device which is connectable to an image holding device via an interface, wherein the image reproducing device functions as a host device and the image holding device functions as a client device, and the image reproducing device obtains image data of digital image and reproduction setting data from the image holding device, a setting for a reproduction of the image data being designated in the reproduction setting data, the method comprising:

controlling the image holding device so that the image reproducing device reads the image data and the reproduction setting data from the image holding device when a print request command comprising a request to reproduce the image data based on the reproduction setting data is received from the image holding device via the interface, wherein the host controller periodically transmits a request inquiry command to the image holding device, and the print request command is transmitted from the image holding device to the image reproducing device after the image holding device receives the request inquiry command, wherein the image holding device is able to transmit another request command other than the print request command to the image reproducing device if the other request command has been generated in the image holding device when the image holding device receives the request inquiry command and the image holding device transmits a negative message to the image reproducing device if neither the print request command nor the other request command has been generated in the image holding device when the image holding device receives the request inquiry command;

judging whether the reproduction setting data is dependent setting which designates reproduction based on reproducing device setting set in the image reproducing device or independent setting which designates reproduction based on individual setting designated in the reproduction setting data;

reproducing the image data based on the reproducing device setting set in the image reproducing device when it is judged that the reproduction setting data is the dependent setting; and reproducing the image data based on the individual setting designated in the reproduction setting data when it is judged that the reproduction setting data is the independent setting.

12. The control method of the image reproducing device according to claim 11, wherein the reproduction setting data contains plural setting items, in the step of judging, it is judged whether each setting item contained in the reproduction setting data is the dependent setting or the independent setting, and in the step of reproducing the image data, setting is performed based on the judgment with respect to each setting item and the image data is reproduced.

13. The control method of the image reproducing device according to claim 12, wherein in the step of reproducing the image data, a conversion process necessary for the reproduction based on the setting is performed to the image data.

14. The control method of the image reproducing device according to any one of claims 11 to 13, further comprising the step of causing a user to set the reproducing device setting in the image reproducing device.

15. The control method of the image reproducing device according to claim 11, wherein the reproduction setting data contains plural setting items, and further comprising judging a setting item, in which a predetermined number of zero digits are included, to be the dependent setting.

16. A control method of an image holding device, which is connectable to an image reproducing device via an interface, wherein the image reproducing device includes a host controller, method comprising:

holding image data of a digital image in an image data holder;

setting a reproduction setting data in which a setting for a reproduction of the image data is designated and which instructs the image reproducing device to reproduce the image data;

generating a print request command in response to an operation unit and another request command, wherein the print request command is a command which requests the image reproducing device to reproduce the image data and the other request command is a request other than the print request command; and allowing the image reproducing device to access the image data in the image data holder under a control of the image reproducing device, wherein the device controller periodically receives a request inquiry command from the image reproducing device, and the print request command is transmitted to the image reproducing device after the request inquiry command is received, the image holding device is able to transmit the other request command to the image reproducing device if the other request command has been generated in the image holding device when the device controller receives the request inquiry command, and the image holding device transmits a negative message to the image reproducing device if neither the print request command nor the other request command has been generated in the image holding device when the device controller receives the request inquiry comment, and the reproduction setting data contains a dependent setting which designates reproduction of the image data based on a reproducing device setting set in the image reproducing device or an independent setting which designates reproduction of the image data based on an individual setting designated in the reproduction setting data.

17. The control method of the image holding device according to claim 16, wherein the reproduction setting data contains plural setting items, and the dependent setting or the independent setting is designated in each setting item.

18. The control method of the image holding device according to claim 17, wherein when the setting item is the independent setting, information specifying setting based on which the image data is reproduced is designated.

19. The control method of the image holding device according to claim 18, further comprising the step of causing a user to designate the dependent setting or the independent setting with respect to each setting item.

20. The control method of the image holding device according to claim 16, wherein the reproduction setting data contains plural setting items, and the image reproducing device judges a setting item, in which a predetermined number of zero digits are included, to be the dependent setting.

21. A record medium in which a program is recorded, wherein the program causes an image reproducing device to execute a procedure, the image reproducing device being connectable to an image holding device via an interface, the image reproducing device functioning as a host device and the image holding device functioning as a client device, and the image reproducing device obtaining image data of digital image and reproduction setting data from the image holding device, a setting for a reproduction of the image data being designated in the reproduction setting data, the procedure comprising:

controlling the image holding device so that the image reproducing device reads the image data and the reproduction setting data from the image holding device when a print request command comprising a request to reproduce the image data based on the reproduction setting data is received from the image holding device via the interface, wherein the host controller periodically transmits a request inquiry command to the image holding device, and the print request command is transmitted from the image holding device to the image reproducing device if the print request command has been generated in the image holding device when the image holding device receives the request inquiry command, wherein the image holding device is able to transmit another request command other than the print request command to the image reproducing device if the other request command has been generated in the image holding device when the image holding device receives the request inquiry command and the image holding device transmits a negative message to the image reproducing device if neither the print request command nor the other request command has been generated in the image holding device when the image holding device receives the request inquiry command;

judging whether the reproduction setting data is dependent setting which designates reproduction based on reproducing device setting set in the image reproducing device or independent setting which designates reproduction based on individual setting designated in the reproduction setting data;

reproducing the image data based on the reproducing device setting set in the image reproducing device when it is judged that the reproduction setting data is the dependent setting; and reproducing the image data based on the individual setting designated in the reproduction setting data when it is judged that the reproduction setting data is the independent setting.

22. A record medium in which a program is recorded, wherein the program causes an image holding device to execute a procedure, the image holding device being is connectable to an image reproducing device via an interface, and the image reproducing device including a host controller, procedure comprising:

holding image data of a digital image in an image data holder;

setting a reproduction setting data in which a setting for a reproduction of the image data is designated and which instructs the image reproducing device to reproduce the image data;

generating a print request command which requests the image reproducing device to reproduce the image data in response to an operation unit; and allowing the image reproducing device to access the image data in the image data holder under a control of the image reproducing device, wherein the device controller periodically receives a request inquiry command from the image reproducing device, and the print request command is transmitted to the image reproducing device if the print request command has been generated in the image holding device when the request inquiry command is received, the image holding device is able to transmit the other request command to the image reproducing device if the other request command has been generated in the image holding device when the device controller receives the request inquiry command, and the image holding device transmits a negative message to the image reproducing device if neither the print request command nor the other request command has been generated in the image holding device when the device controller receives the request inquiry comment, and the reproduction setting data contains a dependent setting which designates reproduction of the image data based on a reproducing device setting set in the image reproducing device or an independent setting which designates reproduction of the image data based on an individual setting designated in the reproduction setting data.

23. A image reproducing system including an image holding device and an image reproducing device connected to the image holding device, wherein the image reproducing device functions as a host device and the image holding device functions as a client device, and the image reproducing device obtains image data of digital image and reproduction setting data from the image holding device, a setting for a reproduction of the image data being designated in the reproduction setting data, wherein the image holding device comprises:
an image data holder which holds image data of a digital image;
an operation unit that sets a reproduction setting data in which a setting for a reproduction of the image data is designated and which instructs the image reproducing device to reproduce the image data;
a request command generator which generates a print request command in response to the operation unit and another request command, wherein the print request command is a command which requests the image reproducing device to reproduce the image data and the other request command is a request command other than the print request command; and
a device controller which allows the image reproducing device to access the image data in the image data holder under a control of the image reproducing device,
wherein the device controller periodically receives a request inquiry command from the image reproducing device, and the print request command is transmitted to the image reproducing device if the print request command has been generated when the request inquiry command is received, wherein the image holding device is able to transmit the other request command other than the print request command to the image reproducing device if the other request command has been generated in the image holding device when the image holding device receives the request inquiry command and the image holding device transmits a negative message to the image reproducing device if neither the print request command nor the other request command has been generated in the image holding device when the image holding device receives the request inquiry command; and
a reproduction setting data transmitter which transmits, to the image reproducing device, reproduction setting data containing setting when the image data is reproduced, the reproduction setting data containing a dependent setting which designates reproduction of the image data based on a reproducing device setting set in the image reproducing device or an independent setting which designates reproduction of the image data based on an individual setting designated in the reproduction setting data, and the image reproducing device comprises:
a host controller which controls the image holding device so that the image reproducing device reads the image data and the reproduction setting data from the image holding device when the print request command comprising a request to reproduce the image data based on the reproduction setting data is received from the image holding device via the interface, wherein the host controller periodically transmits the request inquiry command to the image holding device, and the print request command is transmitted from the image holding device to the image reproducing device if the print request command has been generated when the image holding device receives the request inquiry command;
a judgment section which judges whether the reproduction setting data is the dependent setting or the independent setting; and
a reproduction executor which reproduces the image data based on the reproducing device setting set in the image reproducing device when the judgment section judges that the reproduction setting data is the dependent setting and which reproduces the image data based on the individual setting designated in the reproduction setting data when the judgment section judges that the reproduction setting data is the independent setting.

24. An image holding device which is connectable to an image reproducing device via an interface, wherein the image reproducing device includes a host controller, the image holding device comprising:
an image data holder which holds image data of a digital image;
an operation unit that sets a reproduction setting data in which a setting for a reproduction of the image data is designated and which instructs the image reproducing device to reproduce the image data;
a request command generator which generates a print request command in response to the operation unit and another request command, wherein the print request command is a command which requests the image reproducing device to reproduce the image data; and
a device controller which allows the image reproducing device to access the image data in the image data holder under a control of the image reproducing device;
wherein the device controller periodically receives a request inquiry command from the image reproducing device, and the print request command is transmitted to the image reproducing device if the print request command has been generated when the request inquiry command is received, wherein the image holding device is able to transmit the other request command to the image reproducing device if the other request command has been generated in the image holding device when the device controller receives the request inquiry command, and the image holding device transmits a negative message to the image reproducing device if neither the print request command nor the other request command has been generated in the image holding device when the device controller receives the request inquiry comment; and
a reproduction setting data transmitter which transmits, to the image reproducing device, reproduction setting data containing a dependent setting which designates reproduction of the image data based on a reproducing device setting set in the image reproducing device.

25. The image holding device according to claim 24, wherein the reproduction setting data transmitter transmits the reproduction setting data containing the dependent setting or reproduction setting data containing independent setting which designates reproduction of the image data based on individual setting designated in the reproduction setting data.

26. The image holding device according to claim 24, wherein the reproduction setting data contains plural setting and wherein the image reproducing device judges a setting item, in which a predetermined number of zero digits are included, to be the dependent setting.

* * * * *

UNITED STATES PATENT AND TRADEMARK OFFICE
CERTIFICATE OF CORRECTION

PATENT NO. : 7,599,082 B2
APPLICATION NO. : 10/506198
DATED : October 6, 2009
INVENTOR(S) : Masakatsu Endo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 878 days.

Signed and Sealed this

Fourteenth Day of December, 2010

David J. Kappos
*Director of the United States Patent and Trademark Office*